United States Patent Office 3,102,108
Patented Aug. 27, 1963

---

3,102,108
UREA-FORMALDEHYDE PHARMACEUTICAL COMPOSITIONS
Albert Aebi, Lucerne, and Paul Giger, Wolhusen, Lucerne, Switzerland, assignors to Ed. Geistlich Sohne A.G. fur Chemische Industrie, Wolhusen, Lucerne, Switzerland, a body corporate of Switzerland
No Drawing. Filed Oct. 19, 1959, Ser. No. 847,095
Claims priority, application Switzerland Oct. 20, 1958
3 Claims. (Cl. 260—69)

This invention is concerned with a process for the preparation of novel water-soluble urea-formaldehyde condensation products.

Although various urea-formaldehyde condensation products have been widely used for many years their principal application has been in the fields of adhesives and moulded articles. The condensation products generally employed are usually of the acid catalysed type in which urea units are joined in a two- or even three-dimensional lattice by methylene groups derived from formaldehyde. We have now found that it is possible to prepare, by essentially alkaline condensation, low molecular urea-formaldehyde condensation products which are soluble in water and which possess valuable bactericidal and bacteriostatic properties.

The structure of the new products takes the form of substantially linear chains, possibly lightly cross-linked, in contrast to the 2- or 3-dimensional lattices of the usual urea-formaldehyde resins, and many of the nitrogen atoms in the chains carry hydroxymethylene groups. The proportion of hydroxymethylene groups in the new product may be determined by hydrolysis in strong acid, e.g. 4 N sulphuric acid, the formaldehyde split off being estimated by reaction with 0.1 N-iodine solution with addition of 30% sodium hydroxide. The excess iodine is back-titrated against standard thiosulphate. Estimations of this kind show that the product contains approximately between 45 and 55, preferably 52% $CH_2OH$.

On the other hand, when the product is added to aqueous sodium hydroxide and 0.1 N-iodine solution, titration of excess iodine with thiosulphate indicates only 10 to 20% of $CH_2OH$. Elemental analysis of the new product suggests that the principal recurring unit of the polymer has the empirical formula $(C_3H_6O_2N_2)_n$.

The absence of heavy cross-linking and the presence of a considerable proportion of hydroxymethylene groups is reflected in the physical properties of the new products. Thus, the new urea-formaldehyde condensation products possess a water solubility at 20° C. of 0.05 to 0.5% and a melting point within the range 120 to 150° C. (with evolution of gas). At about 200° C. these products which are normally white become coloured.

The products are further characterised by the possession of infra-red transmission maxima at 3090, 2960, 2500, 1600, 1360, 1425, 1350, 1140, 1110, 840, 780, 730 and 680 cm.$^{-1}$ and infra-red transmission minima at 3350, 3020, 2900, 1630, 1540, 1370, 1240, 1000, 800, 750, 693 and 620 cm.$^{-1}$ The new products possess a wide bacteriostatic spectrum and are active against many strains which are resistant to antibiotics such as penicillin, streptomycin, terramycin, aureomycin and tetracycline. Bacteria which are controlled by the new product include *Staphylococcus aureus*, 2096, 2627, 2076, 2050 and 1, *Streptococcus pyogenes haemolyticus*, *Bacillus pyocyaneus*, Proteus, Enterococci, Typhus, Paratyphus B, *Bacterium coli*, *Salmonella anatum*, *Salmonella choleraesuis*, *Salmonella typhimurium*, *Salmonella london*, *Salmonella enteritidis*, *Shigella dysenteriae*, *diphtheriae* typhus gravis and *Bacillus subtilis*.

It will be seen that the products are active against both pus-stimulating bacteria such as are present in bacterial skin infections and discharging wound infections and also against bacteria present in internal infections such as ulcus cruris.

The new products possess the further advantage of possessing very low toxicity and substantially no skin irritation.

For pharmaceutical purposes the products prepared by the process according to the invention may be formulated in conjunction with a pharmaceutical carrier. For combatting skin and wound infections the formulation may take the form of, for example, a dusting powder (e.g. with talc or similar base) or an ointment or a solution or suspension while for oral presentation the formulation may be in solid form e.g. tablets, capsules and the like or in liquid form e.g. in syrups, elixirs and the like. The products may also be impregnated onto gauze or other suitable material for the production of wound dressings.

A suitable concentration of the active substance in ointments, dusting powders and solutions is from 5–15%, e.g. about 10%.

The process according to the invention for the preparation of the new products falls into two stages. Firstly urea and formaldehyde are reacted in acid aqueous solution, preferably buffered, to form a precondensate. A suitable pH range is 3 to 4, preferably about 3.7, and this can conveniently be achieved using phosphate buffer at about 0.01 M in the reaction mixture; in this stage we have found it convenient to react from 2 to 3, preferably about 2.7 mols of formaldehyde with each mol of urea. The precondensate thus formed is completely in solution in the reaction medium.

The second stage comprises the condensation of the precondensate with additional urea in the presence of alkali. Since the desired product is of comparatively low molecular weight the reaction time and conditions of this stage are preferably carefully controlled. The combination of time and temperature to be used depends to some extent on the method of isolating the product but the optimal conditions can be determined for a given system by simple experimentation. Although there are many ways in which the reaction may be checked and the product isolated from the aqueous solution, one example being neutralisation and evaporation to drynes, we have found that the second stage of the reaction is most suitably carried out by spraying the reaction mixture, after a suitable reaction time at a suitable temperature, into a high temperature drying tower. The air space in the tower is advantageously at about 180 to 200° C. Instead of using a drying tower simple spray drying can be used. We have found that in this way it is possible to control the second condensation stage to give a product having the required characteristics.

It is generally desirable to conduct the second stage of the reaction at a greater concentration than the first stage, partly to facilitate the spray drying step. For this reason we prefer to concentrate the reaction mixture at the end of the first stage by evaporating off in vacuo a proportion of the water and a small amount of excess formaldehyde. However since heating the precondensate reaction medium at either strongly alkaline or strongly acid pH would lead to an undesirable degree of condensation of the precondensate, it is advisable to neutralise the reaction mixture at the end of the first stage (for example after about ½ to 1 hour at about 80° C.) with a small quantity of sodium hydroxide before concentration. A suitable neutral pH is 6.6 to 6.7. The substantially neutral solution can then be concentrated with little further condensation of the precondensate to give a solution of a suitable viscosity for spraying.

The reaction mixture, after concentration and addition of a further quantity of urea preferably at elevated temperature, for example about 50° C., can then be brought to a suitable alkaline pH, for example 8.0, by addition of further sodium hydroxide. We have found that the quantity of urea to be added at the second stage is preferably sufficient to bring the final ratio of formaldehyde to urea to between 1.25 and 2.0, advantageously about 1.6.

In order that the invention may be well understood we give the following example by way of illustration only:

*Example*

15 parts of urea and 0.0375 part of trisodium orthophosphate dissolved in 7.5 parts of water are added with with stirring at 80° C. over a period of 40 minutes to a solution of 0.025 part of monosodium orthophosphate in 54.5 parts of formalin (40% formaldehyde; containing 0.065% formic acid). The pH amount to 3.7. Caustic soda is then added to bring the pH to 6.6 to 6.7 and the reaction solution evaporated in vacuo until 37 parts of distillate (water and formaldehyde) have been removed. The pH is then 7.5. The remaining 51 parts of the reaction solution are heated to 50° C., 10.2 parts of urea are added with stirring and the pH increased to 8 by addition of caustic soda. The turbid and viscous liquid so formed is then sprayed through a rotary nozzle into a drying tower at a drying temperature of 180–200° C. to form a low-molecular condensation product in the form of a difficulty water-soluble, white powder.

The resulting product possessed the following infrared transmission characteristics.

Transmission maxima, percent:

| | |
|---|---|
| 53 | 3090 cm.$^{-1}$ |
| 57 | 2960 |
| 82 | 2500 |
| 26 | 1600 |
| 30 | 1460 |
| 42 | 1425 |
| 39 | 1350 |
| 40 | 1140 |
| 40 | 1110 |
| 63 | 840 |
| 58 | 780 |
| 49 | 730 |
| 38 | 680 |

Transmission minima, percent

| | |
|---|---|
| 20 | 3350 |
| 50 | 3020 |
| 46 | 2900 |
| 16 | 1630 |
| 18 | 1540 |
| 32 | 1370 |
| 26 | 1240 |
| 22 | 1000 |
| 56 | 800 |
| 46 | 750 |
| 27 | 693 |
| 33 | 620 |

In order to estimate the proportion of hydroxymethylene groups present, 100 mg. of the product were added to a mixture of 50 ml. 4 N sulphuric acid and the reaction mixture steam distilled. When the steam distilled fraction reached 475 mls., this quantity was made up to 500 mls. with distilled water. To 100 mls. of this solution were added 25 mls. 0.1 N iodine solution and 30% aqueous sodium hydroxide was added dropwise until the solution was just yellow. After leaving the solution in the dark for 15 minutes, 15 mls. 2 N-sulphuric acid were added and the excess iodine titrated with 0.1 N aqueous sodium thiosulphate in the presence of a small quantity of starch. The results obtained indicated that the product contained 51.8 to 52.1% of $CH_2OH$.

However, when 100 mg. of the product were added to a mixture of 50 ml. N-NaOH and 25 ml. 0.1 N iodine solution and the reaction mixture kept in the dark for 24 hours, 15 mls. aqueous HCl (25%) being then added and the excess iodine back-titrated with 0.1 N-thiosulphate solution, the results indicated that hydroxymethylene groups comprised 16.0 to 16.5% of the product.

Elemental analyses of the product gave the following results: C, 35.98%, 35.68%; H, 5.88%, 6.05%; N, 28.83%, 29.04%.

We claim:

1. A process for the production of a bactericidal urea-formaldehyde condensation product comprising condensing urea with formaldehyde in the proportion of 2–3 mols of formaldehyde for each mol of urea in aqueous solution at a pH between 3 and 4 to form a solution of a water-soluble pre-condensate, adjusting the pH of such solution to a pH greater than 7, adding a further quantity of urea sufficient to bring the overall ratio of formaldehyde to urea to between 1.25 and 2.0 and spray-drying the resultant mixture in an atmosphere maintained at a temperature of 180°–200° C. to form said product having a solubility in water at 20° C. of 0.05–0.5% weight/volume.

2. The process of claim 1 in which the acid aqueous solution of the pre-condensate is neutralized and concentrated before adjusting its pH to a pH greater than 7 and adding the further quantity of urea, the further quantity of urea is added at a temperature of approximately 50° C. and the resultant mixture is spray-dried in an atmosphere maintained at a temperature of 180°–200° C.

3. A urea-formaldehyde condensation product prepared by the process of claim 1.

References Cited in the file of this patent

UNITED STATES PATENTS

| 2,669,551 | Vaughan | Feb. 16, 1954 |

FOREIGN PATENTS

| 532,326 | Canada | Oct. 30, 1956 |
| 124,635 | Switzerland | Feb. 16, 1928 |